No. 880,880. PATENTED MAR. 3, 1908.
M. HARDSOCG.
PNEUMATIC AND OTHER DRILL.
APPLICATION FILED FEB. 25, 1907.
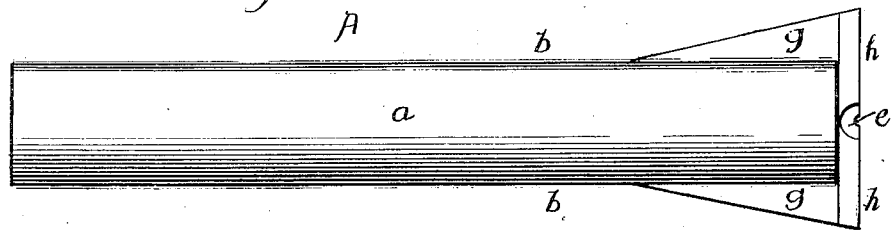
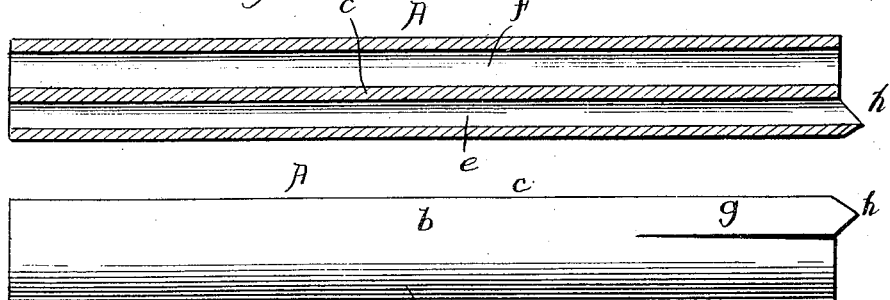
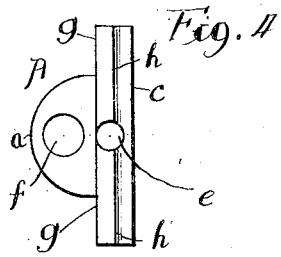 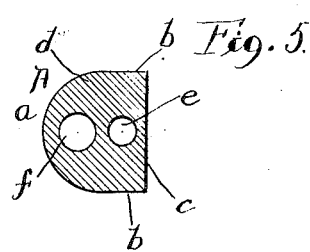
Witnesses
Inventor

UNITED STATES PATENT OFFICE.

MARTIN HARDSOCG, OF OTTUMWA, IOWA.

PNEUMATIC AND OTHER DRILL.

No. 880,880.      Specification of Letters Patent.      Patented March 3, 1908.

Original application filed February 20, 1906, Serial No. 302,049. Divided and this application filed February 25, 1907. Serial No. 359,092.

*To all whom it may concern:*

Be it known that I, MARTIN HARDSOCG, a citizen of the United States, residing at Ottumwa, in the county of Wapello and State of Iowa, have invented certain new and useful Improvements in Pneumatic and other Drills, of which the following is a specification, the same being a division of my application Serial No. 302,049, filed February 20, 1906.

The use of pneumatic drills is attended with the production of fine dust to a greater or less extent, which dust is thrown off by the cutting of the drill and accumulates in the bit of the drill, interfering with the cutting operation, and in addition, this fine dust impregnates the air and is objectionable for that reason.

The object of the present invention is to construct a drill with a shank or stem by which the dust or fine particles will be removed or taken away and not interfere with the operation of the cutting or escape so as to impregnate the air.

The invention consists in the features of construction and combinations of parts hereafter described and claimed.

In the drawings Figure 1 is a side elevation of a drill having two bits or blades each with a cutting edge; Fig. 2 a longitudinal sectional elevation of the drill shown in Fig. 1; Fig. 3 a side elevation of the drill of Fig. 1, showing the edge of a bit or blade; Fig. 4 an end elevation of the drill of Figs. 1, 2 and 3, showing the bits or cutters; and Fig. 5 a cross section through the shank or stem of the drill of Figs. 1, 2 and 3.

The drill shown has a shank or stem A of a D shape in cross section with an exterior consisting of a curved face $a$, oppositely located flat or plane side faces $b$, and a flat or plane side face $c$ opposite to the curved face, as clearly shown in Fig. 5. The flat faces of the shank or stem are of a shape to enable the cutting end of the drill to be upset and furnish two bits or cutters, extending out one from each flat side face $b$ of the body of the shank or stem. The shank or stem has a solid body $d$, extending longitudinally through which is a hole or passage $e$, and a hole or passage $f$, furnishing a clear hole or passage extending from end to end of the shank or stem, with the passage $e$ also extending through the bits or cutters. The hole or passage $e$ furnishes a conduit by which air or other medium can be supplied to the cutting end of the drill, during the cutting operation. The hole or passage $f$ furnishes a conduit through the stem from end to end by which the produced dust and fine particles from the cutting can be withdrawn from the cutting end of the drill and discharged at the rear end of the shank or stem, by the passage of the supplied air from the cutting end of the drill under pressure, which air acts to force and carry with it the fine dust and fine particles, carrying away the fine dust and fine particles from the cutters or blades and keeping the cutting end of the drill perfectly clear and free from becoming clogged or inoperative from the fine dust or particles. The fine dust or particles, carried through the passage or conduit $f$ and discharged at the rear end of the shank or stem of the drill, is discharged into the atmosphere at a point where it will not produce injurious effects from impregnating the atmosphere at the operator's station.

The cutting end of the shank or stem is upset so as to form on each flat straight face $b$ a bit or blade outwardly tapered from the body of the shank or stem and extending parallel with the plane of the shank or stem opposite the curved face thereof, as shown in Fig. 1, and each bit or blade $g$ has a cutting edge $h$ for performing the cutting operation. The supply hole or conduit $e$ for the air or other medium, goes through the cutting edge of the bits or blades $g$ centrally crosswise, as shown in Fig. 4, so that the air or other medium, will be properly delivered to the bits or blades.

The shank or stem of the drill, with its solid body and curved and flat faces for its exterior, furnishes a shank or stem adapted to have formed on its cutting end and on opposite sides two bits or cutters, each with a cutting edge, without the necessity of welding or otherwise attaching the bits or blades. The holes or conduits $e$ and $f$ furnish a means for supplying air or other cooling medium, under pressure to the cutting end of the drill through the passage or conduit $e$, and a means for withdrawing the fine dust and fine particles from the cutting end of the drill through the passage or conduit $f$, of the shank or stem. The passage or conduit $f$ can be connected at the delivery end to a hose or other conductor, if so desired, so as to insure the removal of the fine dust and the fine particles entirely away from the shank or stem, leaving a clear passage through the shank or stem of the drill for the discharge of the fine dust or particles, and where the cooling medium is supplied under pressure, such medium will act to remove the fine dust and the fine particles; but in the event the cooling medium is not under pressure, or is not of a nature to furnish a blast for withdrawing the fine dust and particles, a suction can be applied to the delivery end of the passage or conduit f, by which the fine dust and fine particles can be withdrawn from the acting end of the drill.

What I claim as new and desire to secure by Letters Patent is:

1. A shank for a pneumatic tool having a body of D shape in cross section with its exterior consisting of a curved face, an opposite flat face, and two flat faces connecting the curve face and the flat face, the body furnishing an end face to produce two bits or blades parallel with the plane of the body opposite the curved face thereof, each with a cutting edge, the body having two longitudinal passages one passage for admitting a cooling medium to the acting end of the tool and the other passage for withdrawing dust and fine particles from around the acting end of the tool, substantially as described.

2. A shank for a pneumatic tool having a body of D shape in cross section with its exterior consisting of a curved face, an opposite flat face, and two flat faces connecting the curved face and the flat face, the body furnishing an end face to produce two bits or blades parallel with the plane of the body opposite the curved face thereof, each with a cutting edge, the body having two longitudinal passages one passage for admitting a cooling medium to the acting end of the tool and opening centrally between the two cutters and the other passage for withdrawing dust and fine particles from around the acting end of the tool, substantially as described.

MARTIN HARDSOCG.

Witnesses:
W. A. WORK,
FRED BOWLES.